United States Patent [19]

Chapman

[11] 4,360,187
[45] Nov. 23, 1982

[54] COMPACT HOISTING DEVICE

[76] Inventor: Leonard T. Chapman, 12950 Raymer St., North Hollywood, Calif. 91605

[21] Appl. No.: 275,267

[22] Filed: Jun. 19, 1981

[51] Int. Cl.³ .............................................. B66F 3/00
[52] U.S. Cl. .................................. 254/8 R; 254/2 R; 254/124; 182/2
[58] Field of Search ............. 254/2 R, 2 B, 2 C, 4 R, 254/4 B, 4 C, 8 R, 8 B, 8 C, 9 R, 9 B, 9 C, 10 R, 10 B, 10 C; 182/2; 74/52, 99, 103, 520; 414/589, 590, 733

[56] References Cited

U.S. PATENT DOCUMENTS

| | | | |
|---|---|---|---|
| 2,616,768 | 11/1952 | Stemm | 182/2 |
| 3,168,284 | 2/1965 | Fisher | 254/8 R |
| 3,363,474 | 1/1968 | Ritter et al. | 74/52 |
| 3,401,568 | 9/1968 | Blatt | 74/52 |
| 3,415,021 | 12/1968 | Myers | 182/2 |
| 3,743,049 | 7/1973 | Levrini | 182/2 |
| 3,915,429 | 10/1975 | Zelli | 254/8 R |
| 4,019,604 | 4/1977 | Benson | 182/2 |
| 4,026,519 | 5/1977 | Piercy | 254/2 R |
| 4,056,198 | 11/1977 | Boserup | 414/733 |
| 4,137,797 | 2/1979 | Brems | 74/52 |
| 4,299,533 | 11/1981 | Ohnaka | 414/733 |

Primary Examiner—Robert C. Watson
Attorney, Agent, or Firm—Julian J. Schamus

[57] ABSTRACT

A compact hoisting device is constructed with a primary hoist link pivoted at one end on a shaft secured to a base and pivotally connected to a final hoist link by means of a journal in the other end. A load support is pivotably mounted at the free end of the final hoist link on a shaft driven by attitude control transmission means into a constant spatial attitude regardless of the angular movement of the primary and final hoist links. Motion transmission means engage said journal to ensure that the angular rotation of the final hoist link mirrors the rotational motion of the primary hoist link, itself governed by a hydraulic jack or other drive means. The motion transmission means and the attitude control means may employ planetary gear trains, sprocket-and-chain drives, or parallel-rod drives, as suited to a particular application. One or more intermediate links may be interposed between the primary and final hoist links, with the several links in the hoist train sequentially pivoted to one another.

11 Claims, 10 Drawing Figures

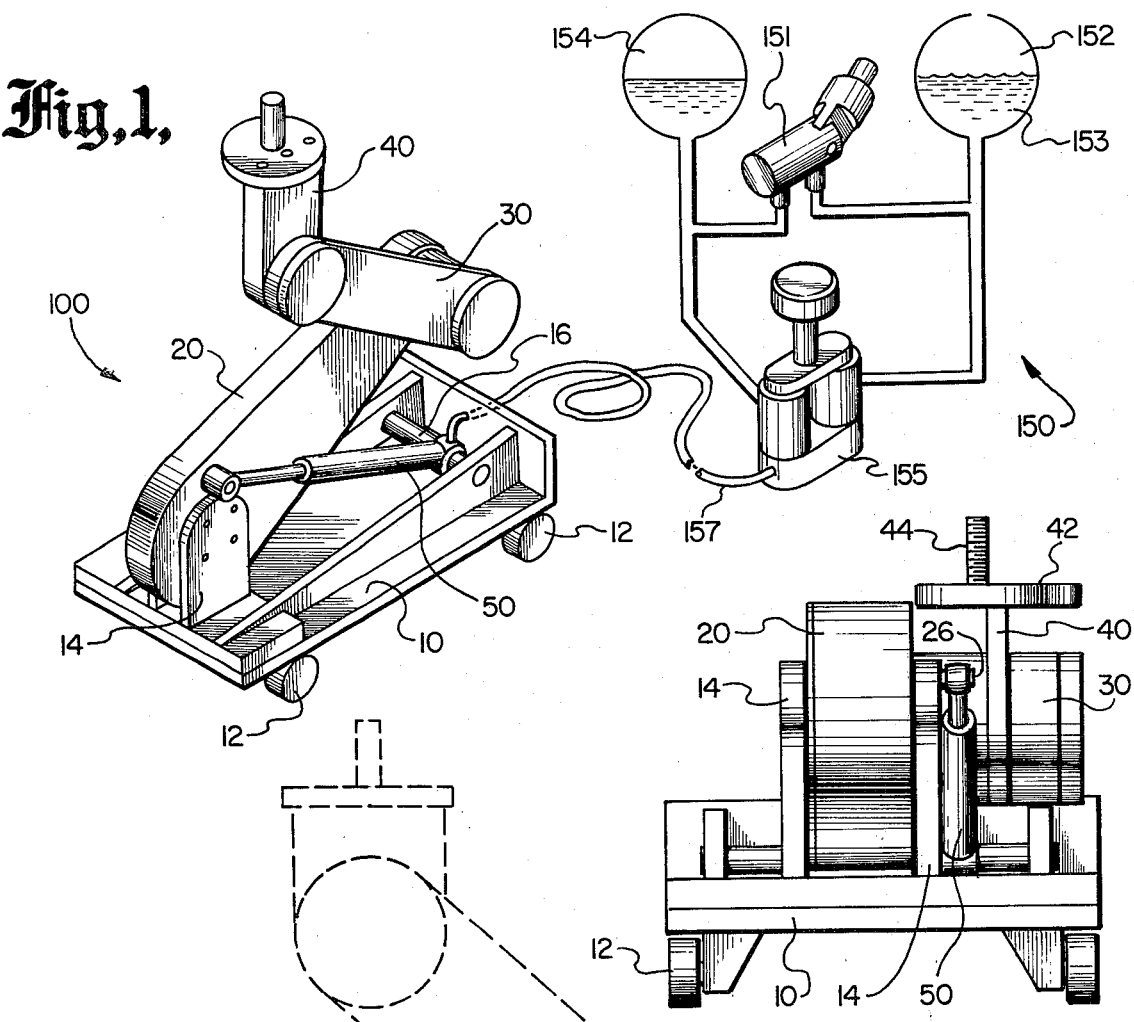
Fig. 1.
Fig. 2, B.
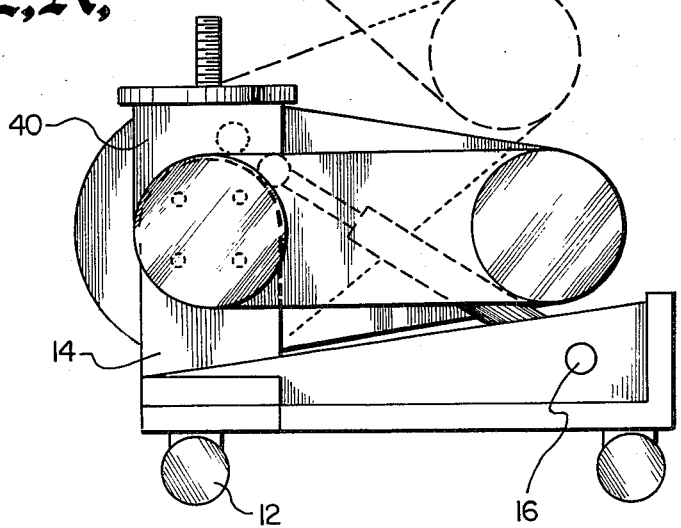
Fig. 2, A.

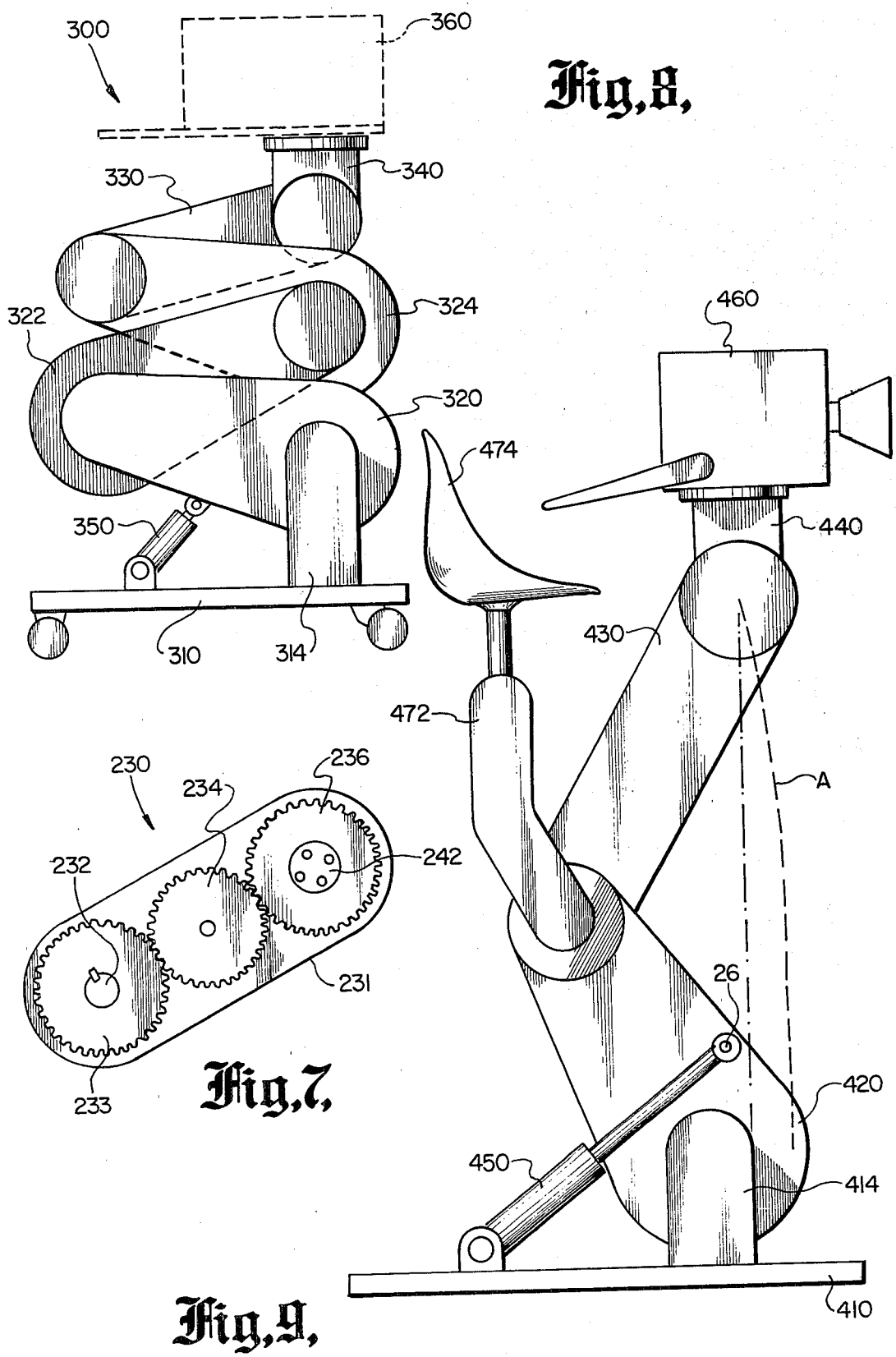

COMPACT HOISTING DEVICE

BACKGROUND OF THE INVENTION

The instant invention relates to hoisting devices and jacks, in particular hoisting devices of a compact nature comprised of a plurality of interconnected pivoting links.

There is a need in many industrial and service arts for a jack or hoisting device which would exhibit compact dimensions, large vertical travel, and a substantially vertical and uniform-velocity travel path for the lifted object or device. Such needs are commonly associated with floor jacks employed in automotive repair shops, with elevating camera dollies in film-making and television production, with lifting devices used by heating and ventillating contractors, in mobile materials handling hoists, and many others.

Several solutions proposed in the prior art utilize pivoting links, especially the widely employed mobil form of the scissors type work platform—and its many analogues in other fields—in which load-lifting links are pivoted in a base and caused to rise by means of a hydraulic actuator, or a manual or electric screw jack. Thus, the crossed link connections of some prior art lifts require twice the lateral space of a comparable lift using only one side of the crossed arm concept to achieve the same displacement. Displacement of the crossed link lift requires at least one set (or side) of the link arms to displace along a bearing surface, thus creating design problems and undesired friction.

It is, therefore, a primary object of the invention to teach the construction of compact hoisting devices employing at least a pair of hoist links—one pivoted in a base, the other pivoted on a cross-shaft at the outboard end of the one—which coact in such a manner that the path of a load support attached to the outboard end of the second hoist link is substantially vertical.

It is a further object of the invention to describe the construction of transmission means governing the relative angular movement of the hoist links in such a hoisting device, so as to generate the desired, substantially vertical travel path, and to ensure that a load platform attached to the end of uppermost hoist link retains a constant alignment.

It is yet another object of the invention to teach the construction of multi-linked hoists, for generating large vertical travel ranges.

It is a further, particular object of the invention to provide a compact elevating device for television and motion picture cameras wherein the substantially vertical travel path of the camera mount is combined with minimal motion around all other degrees of freedom.

SUMMARY

The foregoing objects—and other objects and advantages which shall become apparent from the detailed description of the preferred embodiment, below—are attained in a hoisting device comprising a plurality of mutually pivoted links. A lowest link in the hoist train is pivotably attached to a base which may be stationary or mobile on a set of wheels or casters. Each of the links in the train is provided with a positive drive mechanism—incorporating cogbelts, chains, or gears—for the transmission of rotary motion, so connected that the rotation of any one link in the train about its pivot axis will ensure a corrdinated rotational movement of all other links.

The first link is pivoted, at its inboard end, on a stationary shaft secured to the base. The pivotal movement, in the hoisting mode, is from a substantially adjacent alignment of the links toward a substantially colinear alignment. At this first, or lowest, link in the train is rotated—(by means of an actuator which may rely on muscle power or on hydraulic, pneumatic or electrical drive means)—the drive means associated therewith act on a spigot or journal in the outboard end of the lowest link in such a manner that a second link, affixed to the aforementioned spigot, is entrained into an angular displacement substantially equal in magnitude to the rotation of the first link, but in an opposing sense. With all links in the train in a substantially parallel, horizontal alignment in the fully collapsed state of the hoisting device, the position of the second link is always a mirror image of the position of the first, or primary, link.

Subsequent links in the train—when there are more than two provided in a particular hoisting mechanism—are each rotationally driven by means of transmissions mounted on the antecedent link, so that alternating links in the train assume substantially parallel, superposed alignments as the hoist is extended in the lifting mode. When the load platform is lowered, on the other hand, the links in the train collapse toward a side-by-side, parallel, horizontal position, affording a very compact packing of the load-bearing elements of the hoist, as well as a minimal "base" elevation of the load platform with respect to the base.

The final link in the train is provided with an internal drive mechanism, differing from the transmissions associated with the antecedent links only in the "effective gear ratio", which is designed to maintain the alignment, generally horizontal, of the load platform independently of the alignments of the links in the hoist device. In some embodiments of the invention the actual load—a TV camera, for example—may be attached directly to the output shaft of the transmission of the final, or uppermost, link, dispensing with a separate load platform. In yet other embodiments, there may be no need to ensure a constant alignment of the load platform—as may be the case with automotive floor jacks where a freely pivoted load pad may be used—and the transmission mounted on the final link may be dispensed with.

The train of hoist links incorporated into the elevating device of the invention may—in addition to the primary and final links—include one or more intermediate links. Each intermediate link would be provided with motion transmission means essentially similar to that associated with the primary link. The transmission means associated with all, except the final, hoist links is designed to control the angular movement of the next upper link into angular position whose absolute magnitude is equal to the angular movement of the primary hoist link; such movements being referenced, in all cases, relative to the substantially adjacent, parallel positions of the links in the fully collapsed condition of the hoisting device.

The attitude control means specifically associated with the uppermost, or final, load link is independent of the motion control means—although it may employ similar transmission components such as gears or chains—and serves to transmit the positional alignment of the base to the load platform, maintaining the latter parallel, or in some other fixed spatial relationship, with respect to the former.

The preferred embodiment of the invention employs a pair of hoist links, mutually pivoted on a cross-shaft, with the upper link driven by means of a planetary transmission whose sungear is secured to the base coaxially with the pivot shaft of the lower link. The transmission utilized to constrain the movement of the load platform is continuous through both links, so that the stationary base of the hoisting device can serve as the directional reference for the load platform, thereby attaining great precision in maintaining the attitude of the platform through the lifting range of the hoist.

Yet another feature of the preferred embodiment of the invention is the use of a pressure compensating leverage system to provide actuating force to the lower link, thus providing constant velocity of the load platform.

BRIEF DESCRIPTION OF THE ACCOMPANYING DRAWING

The preferred embodiment of the invention, and some variants thereof, are illustrated in the accompanying drawing in which:

FIG. 1 is a perspective, partly schematic, view of a hoisting device of the invention, powered by a hydraulic actuator;

FIG. 2A is a view in elevation of the embodiment of FIG. 1, showing the hoist assembly at two different positions in its travel range;

FIG. 2B is a frontal view of the embodiment of FIG. 1, in the fully collapsed condition;

FIG. 7 is a fragmentary view of an upper hoist link incorporating a planetary transmission drive for positioning the load support in a hoisting device of the invention;

FIG. 8 is a view in elevation of an alternate embodiment of the hoisting device of the invention, providing for an extended lifting range by the use of multiple, parallel hoist links interconnected to form a continuous train; and FIG. 9 is a side elevation of a movable camera support constructed along the principles of the invention.

DESCRIPTION OF THE PREFERRED EMBODIMENT

Figure 4:
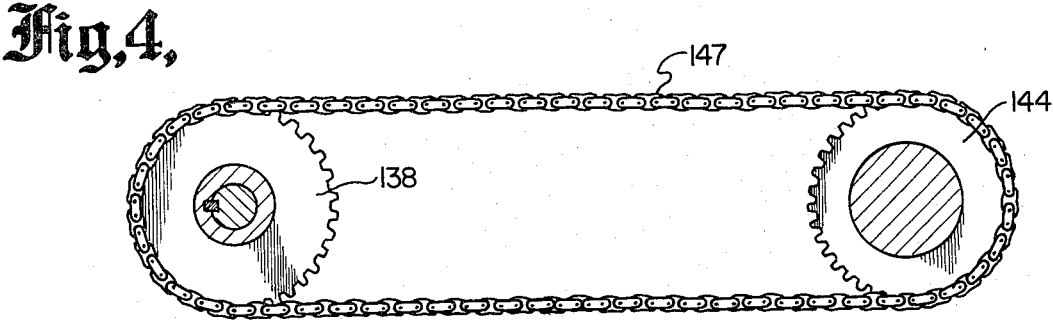
FIG. 4 is a lateral section taken through the embodiment of FIG. 3 along section line 4—4 therein, showing the transmission components associated with the upper hoist link.

The composite view of FIG. 1 shows a hoisting device 100 constructed in accord with the principles of the invention in perspective, as well as a representative hydraulic system for the operation of the hoist 100 in a partly schematic form. The hoist 100 is mounted on base 10 provided with casters or wheels 12 for mobility over a horizontal floor surface. A pair of support plates 14 secure a pivot shaft with respect to the base 10, with a lower hoist link 20 pivoted on that shaft at one end. At the outboard end of the lower hoist link 20 a spigot 129 interconnects the lower link with an upper hoist link 30. A nosepiece 40 is pivotably attached to the outboard end of the upper hoist link 30. A hydraulic actuator 50 is provided, connected to a trunnion shaft 16 affixed in the base 10 at one end, and to a trunnion pin 26 affixed to the external housing of the lower hoist link 20 at the other end. The hydraulic actuator 50 can be extended, for elevating a load attached to the nose-piece 40, or retracted, to lower the load, through the operation of a hydraulic system 150 whose details will be described below.

The hoist links 20 and 30, as shown in FIG. 1 are represented by external housings, the interior space of which, in each of these links, hides a positive rotary motion transmission. The transmission associated with the lower hoist link 20 is so arranged that any rotary motion of the link 20 about the shaft 16 fixed with respect to the support plates 14 is transformed into a rotary movement of the interconnecting spigot between the lower and upper hoist links which is opposite in sense to the rotation of the lower hoist link itself, and essentially double in angular magnitude. The movement of the spigot is imparted to the casing of the upper hoist link 30 in such a manner that the angular displacement of the latter is equal in magnitude to the angular displacement of the lower hoist link when referred to parallel, horizontal reference axes passing through the lower pivots of each link. Briefly, the two hoist links rise from counterposed horizontal positions into linearly aligned vertical positions in unison, forming, at each instant, an equianglular "V" about a horizontal reference passing through the center of their interconnecting shaft.

The transmission associated with the upper hoist link 30 is so constructed, in contrast with that of the lower hoist link 20, that the shaft interconnecting the link 30 with the nose-piece 40 is maintained in angularly invariant position in space. In other words, the rotation of the shaft upon which the nose-piece 40 is mounted is always equal in magnitude, and opposite in sense to the rotational motion of the hoist link 30 itself. With the lower and upper hoist links of equal lengths between their respective pivot axes, and with both starting from a horizontal stowed position, a forcible rotation of the lower hoist link 20 by means of the hydraulic actuator 50 towards a vertical alignment will result in the displacement of the nose-piece 40 in a purely vertical sense, with the nose-piece itself being maintained in a rigidly defined vertical alignment throughout the travel of the hoist mechanism. Alternative embodiments of the transmissions required to achieve these motions will be described below.

The hydraulic system 150 associated with the embodiment illustrated in FIG. 1 comprises a reservoir 152 for hydraulic fluid, a pump 151 and a hydraulic accumulator 154. The pump 151, shown as a manually operated device for the sake of illustration only, is used to convey hydraulic fluid from the volume 153 contained at atmospheric pressure in the reservoir 152 into the accumulator 154, maintained at a pressure level above atmospheric. A control valve 155, suitably of the type described in U.S. Pat. No. 4,109,678, entitled "Fluid Control Valve Assembly", is utilized to interconnect the head-end pressure chamber of the hydraulic actuator 50, via conduit 157, with either the pressurized accumulator chamber 154, or with the reservoir 152. The former of these actions results in the application of pressure to the piston of the hydraulic actuator and, consequently, raises the load attached to the hoist mechanism 100 at its nose-piece 40. The second of the control positions allows hydraulic fluid to drain into the reservoir 153 under the urging of the compression load developer by the weight supported on the hoist, and effects the lowering of the load thereon.

The side view of FIG. 2A illustrates the hoist mechanism 100 at both the collapsed condition, and at a partially elevated condition—shown in dotted outline—substantially corresponding to the state illustrated in FIG. 1. The juxtaposition of the spatial locations of the nose-piece 40 clearly illustrates the vertical travel attained by the operation of the hoist, as well as the relatively large travel range attainable within the confined dimensions of the collapsed assembly.

The end view of FIG. 2 illustrates the nesting of the several components of the hoist 100 in the collapsed state, so as to attain the highly desirable compactness of the assembly. As shown, the lateral spacing between the lower hoist link 20 and the upper hoist link 30 is considerable, both to allow for the positioning of the hydraulic actuator 50 in the interspace so formed, and to minimize the possibility that loose objects, or the body of a careless operator might become entrapped in the scissor-like movement of the two components relative to one another. The manner in which a baseplate 42 and stud 44 are attached to the nose-piece 40 proper is also shown. The particular configuration illustrated being particularly adaptable to the raising of loads—movie cameras, for example—which are intended to be rigidly attached to such hoists by means of threaded sockets in their distal surfaces.

Figure 3:
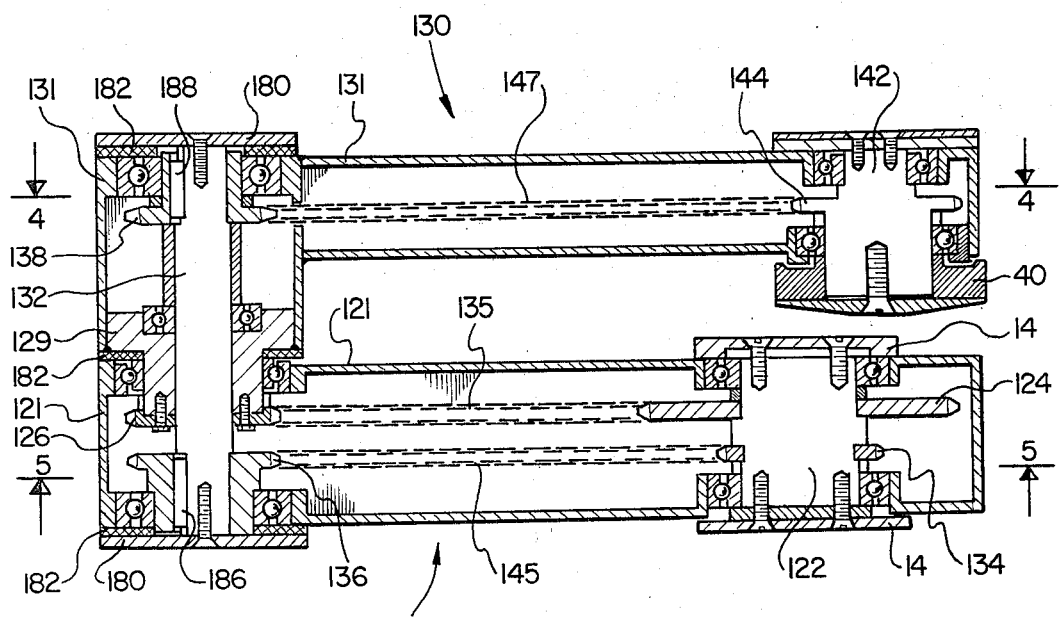
FIG. 3 is a section, in plan, through a particular embodiment of the invention employing sprocket-and-chain transmissions to regulate the motions of the hoist links and load platform.

One potential configuration of the internal transmissions described with reference to the embodiment of the hoist device of the invention shown in FIGS. 1 and 2A/2B is illustrated in the related FIGS. 3, 4 and 5. FIG. 3 is a planar section taken through parallel hoist arms 120 and 130. The link 120 corresponds to the lower hoist link 20 in FIG. 1, while the link 30 corresponds in all essential to the upper hoist link 30 therein. The one detail in which the link 130 is different from the link 30 is its length; in order to utilize to the fullest the available space in the assembly, the link 130 is somewhat longer between pivot shafts than the lower link 120, while maintaining exactly the same overall length across the external enclosures 121 and 131.

The view of FIG. 3 omits all components of the base 10 and actuator 50, or their analogues, which may be otherwise visible in such a view, with the exception of support plates 14 to which a stationary lower pivot shaft 122 is secured by means of threaded fasteners, for the sake of clarity of illustration. Two sprockets 124 and 134 are keyed to pivot shaft 122 and remain stationary with respect to the base of the hoisting device independently of the instantaneous position and movement of the hoist links. The external casing 121 of the lower, or primary, hoist link 120 is the principal load-bearing component of the assembly 120 and is supported in a pair of rolling-element bearings on the shaft 122.

At the outboard, or movable, end of the casing 121 a cross-shaft 132 is rotatably journalled in the casing 121. A sprocket 136 is locked to the shaft 132, by means of key 186, in planar alignment with the sprocket 134; the two sprockets 134 and 136 are operatively locked together by means of chain 145 mating with the teeth of both sprocket wheels in a continuously rotational transmission. Another sprocket 126 is freely rotatable on the cross-shaft 132 and is driven, by means of a chain 135, from sprocket 124. The sprocket wheel 26 is locked to the casing 131 of the upper, and final, hoist link 130, via spigot 129. The spigot 129 is, in turn, welded to the casing 131 so as to form a rigid assembly.

To ensure free movement among the several rotating components of the cross-shaft assembly, rolling-element bearings are interposed between sprocket 136 and spigot 129 and casing 121; as well as between the spigot 129 and cross-shaft 132, and the casing 131 and sprocket 138. To provide the requisite bending stiffness, and to introduce a controlled amount of friction without the concomittant introduction of high static friction forces, three teflon washers 182 are compressed between endplates 180—secured to the ends of crossshaft 132—and the casings 121 and 131, as well as between the apposite faces of the two casings.

The sprocket wheels 134, 136, 138 and 144—forming a part of positive attitude control means for load support 40—are chosen with identical effective diameters, so that any arbitrary diameter on one of . . . these components will remain parallel to a similar diameter on the other, independently of the movement of the link 120. The sprocket wheels 124 and 126 are so chosen, in contrast, that the effective diameter of the former is substantially twice that of the latter, so that the angular displacement, in space, of the driven sprocket 126 will always be equal in magnitude and opposite in sense to the angular displacement of the link 120. Since the sprocket 126 is attached to spigot 129, which is, in turn, affixed to casing 131 of the upper hoist link 130, the spatial angular position of the upper link 30 will be forced to conform to the equi-angular relationship between the two hoist links previously defined.

The cross-shaft 132 is made freely rotatable within the casing 131 of the upper link 130 by means of a bearing connected to that casing directly, as well as indirectly via the previously described journalling of the spigot-piece 129 upon the shaft 132. A sprocket 138 is keyed to that end of the cross-shaft 132 remotest from the sprocket 136 and is driven in unison therewith. A similar sprocket 144 is keyed to a shaft 142 at the outboard end of the casing 131 and connected thereto by means of a chain 147. The diameters of the sprocket wheels 138 and 144 is, once more, identical to those of sprockets 134 and 136 in the same transmission train, and ensure that the shaft 142 shall remain stationary, in terms of angular displacement, with respect to the pivot shaft 122, regardless of the movements of the hoist links 120 and 130. With the load-bearing components of the hoist assembly, represented by nose-piece 40 in the view of FIG. 3, rigidly attached to the shaft 142, the desired restriction of the movement of the load to the vertical direction is attained and any angular movement of the load platform prevented. The train of equal-diameter sprockets 134, 136, 138 and 144, interconnected by chains 145 and 147 constitutes the positive attitude control transmission generally associated with the final hoist link in the assembly.

Similarly, the 2:1 drive effect of the motion transmission comprised of the sprockets 124 and 126, and of the chain 135, defines the transmission associated with the lower hoist link 120, or with each of the links antecedent to the link 130, or its equivalent, where more than two links are employed in the jacking assembly.

The side view of FIG. 4 is a transverse section—taken along section line 4—4 in FIG. 3—and shows that transmission components—sprockets 138 and 144 and chain 147—housed in the casing of the upper hoist link 130.

Figure 5:
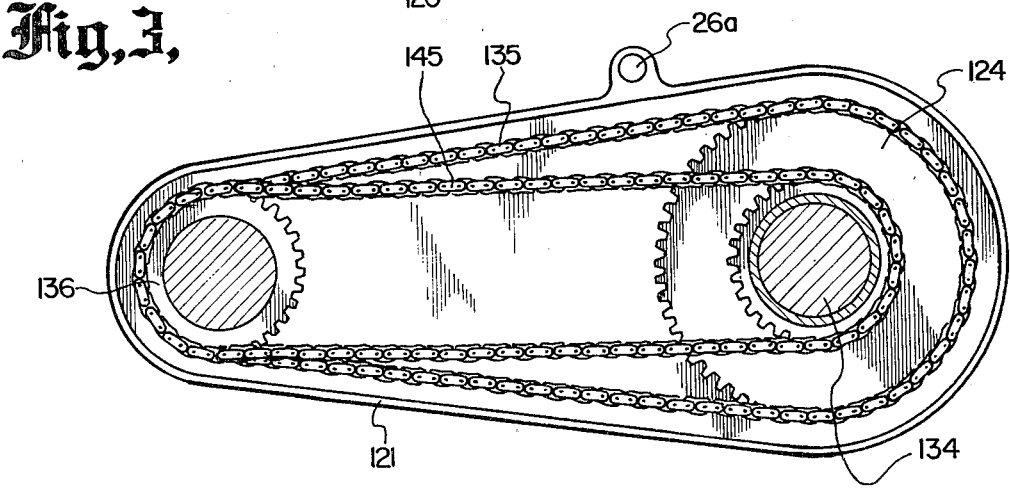
FIG. 5 is another lateral section, taken along section line 5—5 in FIG. 3, showing the transmission incorporated in the lower hoist link of the embodiment of FIG. 3.

FIG. 5 is a transverse section—taken along section lines 5—5 in FIG. 3—similar to that of FIG. 4 and showing the transmission components associated with the lower hoist link 120. Trunnion boss 26a in FIG. 5 indicates the pickup point of an actuator similar to actuator 50 in FIG. 1.

Figure 6:
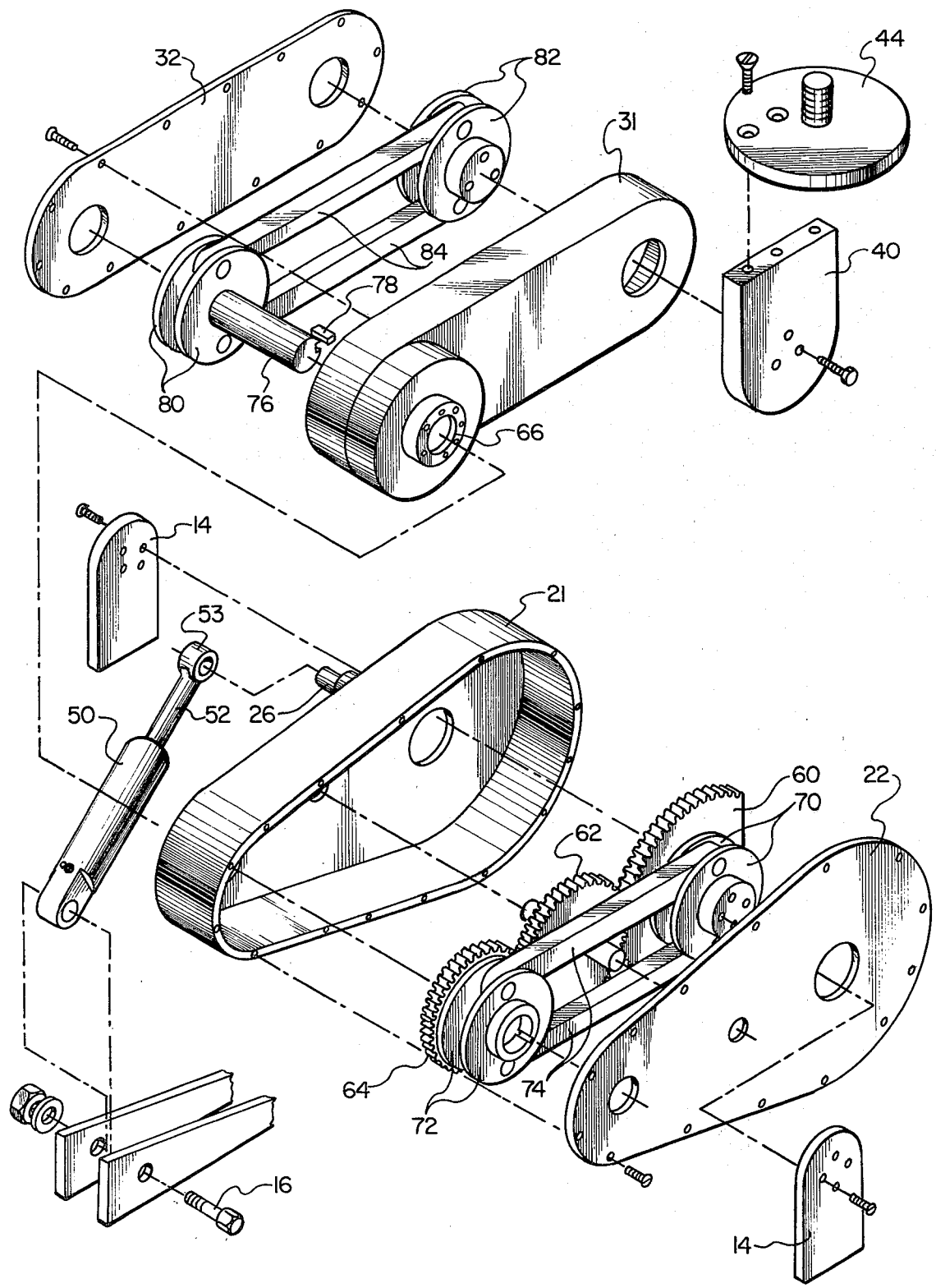
FIG. 6 is an isometric, exploded view of another embodiment of the mechanical transmissions incorporated into the hoist links of the embodiment of FIG. 1.

An alternative group of transmissions—to that shown in FIGS. 3, 4 and 5—is illustrated in the exploded, isometric view of FIG. 6, illustrating the internal transmission components associated with the embodiment of FIGS. 1, 2A and 2B.

As illustrated in FIG. 6, the housing of the lower hoist link 20 is seen to comprise an enclosure 21 and a cover plate 22. Within the housing a sector gear 60 is engaged rigidly upon a shaft bolted to the pair of support plates 14, along with a pair of parallel disks 70, which are also rigidly attached to the shaft. The sector gear 60 is the central member of a planetary transmission encompassing an intermediate gear 62 and a planet gear 64. To obtain the desired motion of the planet gear 64, the pitch diameter of the sun gear 60 is twice that of the planet gear; the diameter of the intermediate gear 62 is immaterial and is chosen to maintain the desired center-to-center distance between the stationary pivot shaft held in the support plates 14 and a cross-shaft 76 upon which the planet gear 64 is freely rotatable on bearing journals. The intermediate gear 62 is journalled in bearings machined into, or affixed to, the enclosure 21 and the cover plate 22.

When the unit is fully assembled, the planet gear 64 is attached, by means of machine screws, to a flange 66 surrounding the journal for cross-shaft 76. The flange 66 is integrally secured to a housing 31—which, with cover plate 32 defines the enclosure of the upper hoist link 30—and provides the means to control the angular position of the link 30 as a function of the angular movement of the lower hoist link 20 with respect to the base 10. This movement is, of course, mediated by means of actuator 50, which is provided with an eye 53 engaged upon pintle 26 as a pivot. The eye 53 is secured to the end of piston rod 52 of the actuator.

The cross-shaft 76 is freely rotatable in journals in the inboard end of the upper hoist link housing and extends through the width of the lower hoist link housing 21. The cross-shaft 76 provides a free support for the planet gear 64 and is keyed, by means of key 78 and apposite keyways in the shaft and in the inner bores of parallel disks 72, to the parallel disk drive members 72. The parallel disks 72 are connected, by means of a pair of links 74, to the parallel disks 70 affixed to the stationary pivot shaft of the assembly. Because of the guiding actions of the parallel rod drive formed by disks 70 and 72, and by rods 74, the cross-shaft 76 is forced to remain stationary, in terms of angular rotation, regardless of its displacement in space through the rotation of the lower hoist link 20. The stationary position of the cross-shaft 76 is, in turn, mediated to the nose-piece 40 by means of a second parallel rod drive—comprised of disks 80, disks 82, and rods 84—contained within the housing 31 of the upper hoist link 30. As a consequence of the interactions of the two parallel rod drives in the two hoist links, and their kinematic interconnections via the cross-shaft 76, the nose-piece 40 is constrained to retain its initial position (normally defined as corresponding to a horizontal alignment of the load placed on the nose-piece 40) throughout the travel of the hoist assembly from an initially horizontal alignment of both hoist links towards a generally vertical alignment of the same members.

FIG. 7 is a partial, transverse section through an upper, or uppermost, hoist arm 230 in which the drive associated with the control of the attitude of the load platform—or of the nose-piece 40 in an embodiment similar to that shown in FIG. 1—is derived from a planetary transmission incorporating a sun gear 233, an intermediate gear 234, and a planet gear 236. The three gears are in constant mesh and the pitch diameters of the sun gear 233 and the planet gear 236 are equal; the pitch diameter of the intermediate gear does not affect the performance of the transmission but the preferred, and illustrated, mode employs an intermediate gear 234 equal in size to the sun and planet gears, as this construction will provide the longest effective link length for a given sun gear diameter.

The operation of the alternative transmission shown in FIG. 7 is straightforward. The sun gear 233 is keyed to a cross-shaft 232 of the attitude control, the intermediate gear is freely rotatable in journals fixed in the casing, and the planet gear is attached to a load platform shaft 242 which is rotatably journalled with respect to the casing and protrudes therefrom to engage the support lugs of the load platform or its equivalent. The rotation of the upper hoist link defines the relative motion of the geartrain, and the correspondence of the diameters of the gears 233 and 236 ensures that the shaft 242 remains unrotated for all angular positions of the hoist link 230.

It is evident from the foregoing discussion of the embodiments of FIGS. 3, 6 and 7, that there are a number of alternative methods to secure the desired motions of the lower hoist links, the uppermost hoist link, and the load support shaft. In particular, a 2:1 planetary transmission may be used in the place of a 2:1 chain drive transmission—or the latter's equivalent in cog-belt drives of their like—to secure the relative angular displacement of mutually pivoted hoist links. Similarly, a 1:1 chain drive may be used, in place of a 1:1 planetary transmission or a parallel rod drive, to secure the absolute immobility in the rotational sense of the load support shaft and the load platform affixed thereto.

These drive means are interchangeable and, in the case where a plurality of lower hoist links are employed—as will be more fully discussed with reference to FIG. 8, below—to secure a greater range in vertical travel without a commensurate enlargement of the hoisting device dimensions, adjacent links may be provided with different transmissions to secure the desired kinematic ends. Considerations of size, weight, cost, mechanical stiffness, and the propensity to free play may indicate the preferred solution to a given problem adapting the teachings herein to a particular practical embodiment, the principle demands of the transmission are all satisfied by the combinations of elements described hereinabove.

FIG. 8 is a view in elevation of a multi-linked jack 300 mounted on a mobile base 310. The train of links—deployed by an actuator 350—includes a lower hoist 320, intermediate hoist 322 and 324, and upper link 330. The upper link 330 is provided with an output shaft affixed to load carrier 340. A load-bearing platform 370 is supported by load carrier 340. A load box 360 is also shown, representing the useful objects it may be desired to elevate, using the hoisting device 300.

In a multi-linked hoist, such as shown in FIG. 8, all hoist links except the final link 330 or its equivalent, is provided with motion transmission means of the type associated with the lower link 20 in the embodiment of FIG. 1. The rotational motion of the cross-shafts interconnecting adjacent links in the train, is twice the corresponding angular displacement of the antecedent link and in an opposing sense. This relationship maintains the desired equi-angular rotation of all links about their respective pivots.

The side elevation of FIG. 9 shows a hoist device 400 specifically adapted to elevate and lower a movie camera 460 as the useful load. In the motion picture and TV arts it is a very common requirement that a camera be so mounted that it can be readily elevated, and the hoisting device of the invention is particularly adapted to secure the desired smooth, constant-speed movement in a substantially vertical travel path which are primary requirements in such employment.

The camera hoist 400 is provided with a base 410—which is shown as a stationary baseplate but may be developed into a manually or power-operated movable dolly—a lower hoist link 420, an upper hoist link 430 and load support 440. An operator's chair 474 is borne on a bracket attached to a flange outboard of the pivot interconnecting the lower and upper hoist links. In terms of the internal transmission mechanism used, the hoist 400 may be provided with a mechanism similar in all respects to that shown in the view of FIG. 6, with the flange bearing the bracket 472 attached to an outboard projection of the cross-shaft 76. This mechanical arrangement ensures that that operator's chair 474 remains upright at all vertical positions of the hoist.

For the sake of maximum volumetric packing efficiency, the upper hoist link of the device 400 is equal in length to the lower hoist link 320, so that the center-to-center distance between cross shaft 76 and the rotational axis of parallel disks 82 is longer than the corresponding center-to-center distance between parallel disks 70 and 72 in the lower hoist link. As a result of this geometric disproportion, albeit a very small one, the actual travel path of the load support 440 describes a circular arc "A" in space.

Should this minor deviation from the purely vertical travel path represent a problem in any given application of the hoist of the invention, the transmission ratio between sun gear 60 and planet gear 64 may be altered from the 2:1 relationship previously described—to 1.95:1 for example—so as to compensate for the differential effective radii of the two hoist links in the mechanism.

Where an actuator similar in operating characterisitics to the hydraulic ram 50—having an essentially constant force characteristic through its extension range—is employed, it is advantageous, in order to achieve the desired constant travel speed for the load, that the axis of the actuator be substantially in quadrature with the line intersecting the pivot points of the primary hoist link. As shown, most particularly in FIG. 9, this condition can be attained in a very compact mechanism, if the trunnion 26, or its equivalent, is located proximate to the upper boundary of the primary hoist link housing.

In the embodiments illustrated above, an attitude control transmission was provided for maintaining a specific alignment of the load platform. In some uses of the hoisting device of the invention—as an automotive floor jack, for example, it is not necessary to maintain a specific attitude of the load platform. It is conventional in such jacks to provide a freely pivoted load pad which adapts to the local geometry of the vehicle being lifted and retains its alignment by the bearing load of the vehicle itself. In such uses, the transmission associated with the attitude control task can be omitted and the equivalent of load support 40 allowed to freely pivot on the final hoist link casing.

The hoisting device of the invention may be adapted to many industrial and service uses requiring minor modifications of its several components or auxiliary systems—such as the configuration of the base, or the motive mechanism for elevating the load. Such changes and modifications shall be deemed to be encompassed by the disclosure herein.

I claim:

1. A hoisting mechanism for projecting a load along a substantially linear travel path by means of a train of elongated hoist links sequentially pivoted to one another, comprising:

a base;

a primary link, pivotably attached to said base;

a final link, operatively connected to said primary link;

motion transmission means, to project and rotate said final link such that the angular travel of said final link substantially equals the absolute value of the angular travel of said primary link;

a load support, pivotably mounted on said final link;

positive attitude control means, independent of said motion transmission means, to maintain a constant spatial attitude of said load support, with respect to said base; said positive attitude control means including:

a cross-shaft, coaxial with a hinge axis passing through the outboard end, remote from said base, of said primary link and the inboard end, remote from said load support, of said final link;

journal means, allowing for the free rotation of said cross-shaft independent of the position of either hoist link;

a load support shaft integral with said load support and parallel to said cross-shaft;

a pivot shaft, irrotatably fixed in said base;

a primary mechanical position control drive operatively interconnecting said pivot shaft with said cross-shaft, said primary mechanical position control drive incorporating parallel drive rods pinned to planarly aligned disks keyed, respectively, to said horizontal pivot shaft and to said cross shaft;

a final mechanical position control drive, operatively interconnecting said cross-shaft with said load support shaft, and actuator means, for impelling said primary link into rotational movement about said pivot axis, thereby elevating said load support.

2. The hoisting mechanism of claim 1, additionally comprising at least one intermediate link operatively connected between said primary link and said final link.

3. The hoisting mechanism of claim 1, wherein said motion transmission means include:

a spigot, affixed to the inboard end of said final link, remote from said load support, rotatably journalled in the end of said primary link remote from said base;

a sungear irrotatably fixed with respect to said base;

a planet gear, keyed to said spigot; and an idler gear, intermediate between said sungear and said planet gear and in mesh with both.

4. The hoisting device of claim 3, wherein the pitch diameter of said sungear is substantially twice the pitch diameter of said planet gear.

5. The hoisting mechanism of claim 2, wherein said motion transmission means include:
- a sungear in said primary link irrotatably fixed with respect to said base;
- spigot shafts affixed to the inboard end of said final link and of each of said intermediate links, rotatably journalled in the outboard end of the antecedent link in said train of hoist links;
- a sungear affixed coaxially with each of said spigot shafts in each of said intermediate links coaxial with said sungear in said primary link;
- a spigot, affixed to an inboard end of said final link, remote from said load support, rotatably journalled in an outboard end of the next antecedent intermediate link;
- planet gears, keyed to said spigot and said spigot shafts; and
- idler gears, intermediate between pairs of said sungears and said planet gears and in mesh with both.

6. The hoisting mechanism of claim 1, wherein said motion transmission means include:
- a spigot, affixed to an inboard end of said final link, remote from said load support, rotatably journalled in the outboard end of said primary link remote from said base;
- a drive sprocket, keyed to said base;
- a driven sprocket, keyed to said spigot; and
- a continuous chain passing over said drive sprocket and over said driven sprocket.

7. The hoisting mechanism of claim 6, wherein said drive sprocket pitch diameter is substantially twice the pitch diameter of said driven sprocket.

8. The hoisting mechanism of claim 1, wherein said final mechanical position control drive incorporates parallel drive rods pinned to planarly aligned disks keyed, respectively, to said cross-shaft and said load support shaft.

9. The hoisting mechanism of claim 1, wherein said primary mechanical position control drive includes a pair of planarly aligned sprockets of identical pitch diameter keyed, respectively to said horizontal pivot shaft and to said cross-shaft, and a continuous drive chain passing over both said sprockets.

10. The hoisting mechanism of claim 1, wherein said primary mechanical position control drive includes a sungear, keyed to said horizontal pivot shaft, and a planet gear, keyed to said cross-shaft, with the pitch diameters of said sungear and said planet gear equal, in addition to an intermediate gear freely rotatable on bearings in said primary hoist link and in mesh with said sungear and said planet gear.

11. The hoisting mechanism of claim 10, wherein said intermediate gear is identical in pitch diameter to said sungear and to said planet gear.

* * * * *